(12) United States Patent
Schrewe

(10) Patent No.: US 11,613,996 B2
(45) Date of Patent: Mar. 28, 2023

(54) PRE-SWIRL NOZZLE CARRIER AND METHOD OF MANUFACTURING THE SAME

(71) Applicant: Rolls-Royce Deutschland Ltd & Co KG, Blankenfelde-Mahlow (DE)

(72) Inventor: Sebastian Schrewe, Berlin (DE)

(73) Assignee: ROLLS-ROYCE DEUTSCHLAND LTD & CO KG, Blankenfel de-Mahlow (DE)

( * ) Notice: Subject to any disclaimer, the term of this patent is extended or adjusted under 35 U.S.C. 154(b) by 0 days.

(21) Appl. No.: 17/101,738

(22) Filed: Nov. 23, 2020

(65) Prior Publication Data
US 2021/0164351 A1 Jun. 3, 2021

(30) Foreign Application Priority Data
Nov. 28, 2019 (DE) ...................... 10 2019 132 303.7

(51) Int. Cl.
*F01D 5/08* (2006.01)
*F02C 7/18* (2006.01)
*F01D 25/12* (2006.01)

(52) U.S. Cl.
CPC ............ *F01D 5/082* (2013.01); *F01D 5/081* (2013.01); *F01D 25/12* (2013.01); *F02C 7/18* (2013.01);
(Continued)

(58) Field of Classification Search
CPC .... F01D 5/082; F01D 5/081; F05D 2260/201; F05D 2260/14
See application file for complete search history.

(56) References Cited

U.S. PATENT DOCUMENTS

| 5,333,993 A * | 8/1994 | Stueber ................. F01D 11/001 415/178 |
| 2002/0028136 A1* | 3/2002 | Briesenick ............ F01D 11/025 415/115 |

(Continued)

FOREIGN PATENT DOCUMENTS

| CN | 107218083 A | 9/2017 |
| DE | 102015225505 A1 | 6/2017 |

OTHER PUBLICATIONS

German Search Report dated Jun. 24, 2020 from counterpart German Patent Application No. 10 2019 126 123.6.
(Continued)

*Primary Examiner* — Gerald L Sung
*Assistant Examiner* — Alyson Joan Harrington
(74) *Attorney, Agent, or Firm* — Shuttleworth & Ingersoll, PLC; Timothy J. Klima

(57) ABSTRACT

A pre-swirl nozzle carrier for a gas turbine engine, includes: a wall having front and rear sides, and a multiplicity of pre-swirl nozzles formed in the wall and which each have a flow passage, wherein the flow passage has an inlet opening at the front side and an outlet opening at the rear side. The flow passages are provided and designed to discharge air, which has flowed in via the inlet opening, with swirl from the outlet opening. It is provided that the inlet opening is surrounded by a periphery which, at least in certain sections, has a region with a convex curvature adjacent to the flow passage and has a region with a concave curvature adjacent to said region with a convex curvature. The invention furthermore relates to a method for producing a pre-swirl nozzle in a pre-swirl nozzle carrier.

16 Claims, 9 Drawing Sheets

(52) U.S. Cl.
CPC .............. *F01D 5/085* (2013.01); *F01D 5/087* (2013.01); *F05D 2250/711* (2013.01); *F05D 2250/712* (2013.01); *F05D 2260/14* (2013.01); *F05D 2260/201* (2013.01)

(56) References Cited

U.S. PATENT DOCUMENTS

| | | |
|---|---|---|
| 2010/0275612 A1 | 11/2010 | Smoke et al. |
| 2016/0061451 A1 | 3/2016 | Dudebout et al. |
| 2016/0108739 A1 | 4/2016 | Musto et al. |
| 2018/0274370 A1* | 9/2018 | Bunker .................. F01D 5/186 |
| 2019/0316472 A1 | 10/2019 | Xu |

OTHER PUBLICATIONS

Klocke, F; Koenig, W.: Manufacturing process 3—Ablation, generation, laser material processing. 4th edition. Berlin: Springer Verlag, 2007. pp. 2 to 6, 19, 24.—ISBN 978-3-540-23492-0.

\* cited by examiner

PRE-SWIRL NOZZLE CARRIER AND METHOD OF MANUFACTURING THE SAME

This application claims priority to German Patent Application DE102019132303.7 filed Nov. 28, 2019, the entirety of which is incorporated by reference herein.

The invention relates to a pre-swirl nozzle carrier and to a method for the production thereof, according to the present disclosure.

The use of pre-swirl nozzles in gas turbine engines is fundamentally known, and is described for example in CN 107218083 A. Pre-swirl nozzles serve for diverting cooling air into a rotational direction upstream of a rotating component, for example upstream of a rotating turbine disk, and in so doing imparting swirl to the cooling air. By means of the swirl of the cooling air, the total temperature at the rotating component in the relative reference system is reduced in an effective manner. Swirl furthermore reduces aerodynamic friction losses at the rotating component.

Pre-swirl nozzles typically form a separation bubble downstream of the inlet region of the pre-swirl nozzle. Such a flow separation reduces the outlet velocity of the air at the exit of the pre-swirl nozzle. The associated reduced swirl is disadvantageous for effective cooling of the rotating component that is to be cooled. The problem is duly reduced, but not eliminated, through the provision of bevels in the inlet region, by means of which the sharp edges in the inlet region are avoided.

The present invention is based on the object of providing a pre-swirl nozzle carrier with pre-swirl nozzles which impart intense swirl to the air flowing through the pre-swirl nozzle. It is furthermore sought to provide a method for the production of such pre-swirl nozzles.

Said object is achieved by means of a pre-swirl nozzle carrier having the features as disclosed herein and a method for producing a pre-swirl nozzle having features as disclosed herein. Refinements of the invention are indicated in the present disclosure.

Accordingly, according to a first aspect of the invention, the invention relates to a pre-swirl nozzle carrier for a gas turbine engine, which pre-swirl nozzle carrier comprises a wall which has a front side and a rear side. In the wall, there are formed a multiplicity of pre-swirl nozzles which each have a flow passage which extends from the front side of the wall to the rear side of the wall, wherein the flow passage has in each case an inlet opening at the front side of the wall and an outlet opening at the rear side of the wall. The flow passages are provided and designed for discharging air, which has flowed in via the inlet opening, with swirl from the outlet opening, for example in a direction of rotation of a rotor adjacent to the pre-swirl nozzle carrier.

Here, it is provided that the inlet opening is surrounded by a periphery which, at least in certain sections, has a region with a convex curvature adjacent to the flow passage and has a region with a concave curvature adjacent to said region with a convex curvature. The periphery is thus outwardly curved radially at the inside, that is to say adjacent to the flow passage, and inwardly curved adjacent to this.

The present invention is based on the concept of providing the inlet of the pre-swirl nozzle with a structured periphery which is formed at the front side of the wall and which has a concave curvature adjacent to the flow passage, adjacent to which concave curvature there is a convex curvature. It has been found that such a shaping of the periphery of the flow passage is aerodynamically expedient and minimizes a flow separation in the inlet region. In this way, the swirl provided by the pre-swirl nozzle is increased, which in turn leads to improved cooling of the component that is to be cooled. It is thus for example possible, in a gas turbine engine in which the pre-swirl nozzles are implemented, for the inlet temperature at the rotor blades, which are to be cooled, of the turbine (the "blade feed temperature") to be reduced, which, through a reduction of the required cooling mass flow, leads in turn to an improvement in the specific fuel consumption and to a reduction in the generation of nitrogen oxides.

An aerodynamically expedient action of the structured periphery with convex curvature and concave curvature arises from the fact that, through the combination of a convex curvature and a concave curvature, it is ensured that the inlet into the flow passage is always of smooth form without sharp edges. Here, the provision of a concave curvature in addition to the convex curvature may duly result in increased turbulence upstream of the inlet of the flow passage. This however improves a reattachment of the flow to the flow path boundary in the flow passage in relation to the situation in which flow separation occurs downstream of the entrance of the flow passage.

The statement that the periphery of the inlet opening is at least partially structured in the stated manner is to be understood to mean that the structuring of the periphery is not necessary implemented over 360° in a circumferential direction, even if this is the case in exemplary embodiments.

One configuration of the invention provides that the periphery of the inlet opening is of S-shaped form in longitudinal section. This means that the convex, outwardly directed curvature and the concave, inwardly directed curvature of the periphery of the inlet opening are of symmetrical form with respect to one another and the two curvatures transition directly into one another.

A further configuration provides that the region of the convex curvature of the periphery extends over a greater radial thickness than the region of the concave curvature. Alternatively, the region of the convex curvature of the periphery may extend over a smaller radial thickness than the region of the concave curvature. It is not necessary for the radial extent of the two differently curved regions of the periphery to be identical.

That of the exact course of the concave curvature of the periphery is defined by the outer boundary line of the periphery in longitudinal section. One design variant in this regard provides that the outer boundary line forms a semicircle in longitudinal section in the region of the convex curvature. Correspondingly, it may be provided that the outer boundary line of the periphery forms a semicircle in longitudinal section in the region of the concave curvature.

In exemplary embodiments, it is provided that the periphery is of symmetrical form in a circumferential direction, that is to say over a range of 360°. However, this is not necessarily the case. For example, in alternative configurations, it may be provided that the periphery of the entrance opening has a different shape on one side of the flow passage than on the other side of the flow passage.

The present invention is not restricted to particular forms of the course of the flow passage in the wall. It is of importance merely that the air in the flow passage is subjected to swirl in accordance with the function of the pre-swirl nozzle. In this regard, it is known for example from CN 107218083 A that, adjacent to the front side of the wall, the flow passage initially runs perpendicular to the front side and then has a curvature such that, at the rear side of the wall, said flow passage runs obliquely with respect to said rear side. Alternatively, it may be provided that, already at the front side of the wall, the flow passage runs obliquely with respect to said front side. For example, the flow passage extends rectilinearly overall, and in so doing extends obliquely through the wall.

If, at the front side of the wall, the flow passage runs obliquely with respect to said front side, it may be provided that the periphery of the inlet opening is formed in a plane which runs at an angle with respect to the plane of the front side. If the front side is curved, a plane of the front side is regarded as the plane that the front side forms locally in the region that surrounds the periphery. The structured periphery thus lies not entirely in the plane of the front side of the wall, but rather runs obliquely with respect thereto. This makes it possible for the structuring of the periphery provided by means of the invention to extend symmetrically around the inlet opening, even though the flow passage extends obliquely with respect to the front side of the periphery.

If, at the front side of the wall, the flow passage extends obliquely with respect to said front side, it may furthermore be provided that the front side of the wall has an indentation in which the periphery of the inlet opening at least partially extends. The indentation facilitates the formation of the periphery in a plane that runs obliquely with respect to the plane of the front side of the wall.

According to a further aspect of the invention, the invention relates to a pre-swirl nozzle carrier for a gas turbine engine, which is distinguished by the fact that the front side of the wall is connected to an inlet funnel which protrudes from the front side of the wall and which surrounds the inlet opening of the flow passage. This aspect of the invention attains an optimum introduction of cooling air into the flow passage of the pre-swirl nozzle by virtue of a separate inlet funnel, which is of aerodynamically expedient form, being provided for the optimum introduction of the cooling air. From the funnel, the cooling air is then conducted into the inlet opening. A flow separation or the formation of a separation bubble are avoided in this way.

Here, it may be provided that the inlet funnel constitutes a separately produced part which is connected to the front side of the wall in the region of the inlet opening. For example, the inlet funnel is inserted into cutouts which the pre-swirl nozzle carrier forms adjacent to the flow passage of the pre-swirl nozzle in the region of the front wall.

A further configuration provides that the inlet funnel forms an inflow duct which runs coaxially with the flow passage of the pre-swirl nozzle, such that the air flowing into the inlet funnel can enter the flow passage without being diverted.

The inlet funnel is of aerodynamically expedient shape, such that as far as possible no flow separations occur in the air flowing into the inlet funnel. For example, it is provided that the inlet funnel, at its end protruding from the pre-swirl nozzle carrier, forms a funnel-shaped inlet with rounded ends.

For all invention variants, it is the case that the flow passage of the pre-swirl nozzles may basically be of any desired shape in cross section. Exemplary shapes are a circular cross section, an elliptical cross section or a rectangular cross section.

For example, the pre-swirl nozzle carrier is of ring-shaped form. In a gas turbine engine, said pre-swirl nozzle carrier forms for example a constituent part of a static structure of the high-pressure turbine. The pre-swirl nozzles are for example arranged in a ring shape in the pre-swirl nozzle carrier. Said pre-swirl nozzles may in this case form one or more rings. For example, the pre-swirl nozzle carrier comprises between 4 and 60 pre-swirl nozzles in one ring.

According to a further aspect of the invention, a high-pressure turbine of a gas turbine engine is provided, which has a pre-swirl nozzle carrier according to the present disclosure, wherein the pre-swirl nozzle carrier is formed in a static component of the high-pressure turbine, and the pre-swirl nozzles of the pre-swirl nozzle carrier are provided to receive cooling air and divert it in the direction of a rotating turbine disk.

According to a further aspect of the invention, the invention relates to a gas turbine engine which has: a compressor, a turbine, a combustion chamber arranged between the compressor and the turbine, and a pre-swirl nozzle carrier according to the present disclosure, which is provided and designed to divert cooling air in the direction of rotating parts of the turbine.

Here, the gas turbine engine may furthermore have:
an engine core which comprises the turbine, the compressor and a turbine shaft connecting the turbine to the compressor and formed as a hollow shaft;
a fan which is positioned upstream of the engine core; and
a gear box that receives an input from the turbine shaft and outputs drive for the fan via a fan shaft so as to drive the fan at a lower rotational speed than the turbine shaft.

According to a further aspect of the invention, the present invention relates to a method for producing a pre-swirl nozzle in a pre-swirl nozzle carrier which has a wall with a front side and a rear side, wherein, in the wall, there is formed a flow passage which extends from the front side of the wall to the rear side of the wall, wherein the flow passage has an inlet opening at the front side of the wall and an outlet opening at the rear side of the wall, and wherein the inlet opening of the flow passage is surrounded by a periphery. The invention provides that the periphery of the inlet opening is produced by spark erosion using an electrode which has a frontal structured surface, wherein, during the spark erosion process, the frontal surface of the electrode works gradually into the front side of the wall by material removal, and in so doing imparts a defined shape to the periphery of the inlet opening. Here, the frontal structured surface of the electrode forms a positive shape which imparts the shape of the periphery of the inlet opening as a negative shape to the front side of the wall.

The method according to the invention is associated with the advantage that the structuring of the periphery of the inlet opening can be performed in one working step together with the production of the flow passage. This makes the production method straightforward and effective. A further advantage consists in that the structuring of the periphery can be performed in a repeatable manner with only small manufacturing tolerances, because the periphery is provided, independently of the penetration depth of the electrode, by embossing of the wall material during the course of the spark erosion process.

The structuring of the frontal surface or the positive shape may extend over 360° in a circumferential direction, such that the positive shape and accordingly, as negative shape, the periphery of the inlet opening are of rotationally symmetrical form in the circumferential direction. In other configurations, the positive shape and accordingly also the negative shape are not symmetrical. For example, the periphery of the entrance opening may have a different shape on one side of the flow passage than on the other side of the flow passage.

One configuration of the method provides that the flow passage is also produced by spark erosion using the electrode, wherein a front section of the electrode works gradually through from the front side to the rear side of the wall by material removal corresponding to the course of the flow passage. Here, the formation of the flow passage and the provision of a structured periphery of the inlet opening are performed in only one step.

It is however basically likewise conceivable for the flow passage of the pre-swirl nozzle to have been formed in the wall in advance. In this case, it may be provided that the flow passage is subjected to reworking by a front section of the electrode if a defined shape is imparted to the periphery of the inlet opening at the front side of the wall.

A further configuration of the method provides that the frontal structured surface of the electrode has, radially at the inside, a concave region which imparts a convex curvature to the periphery of the inlet opening adjacent to the flow passage, and said frontal structured surface has, adjacent to said concave region radially to the outside, a convex region which imparts a concave curvature to the periphery of the inlet opening. In this way, the inlet of the pre-swirl nozzle is provided with a structured periphery which, adjacent to the flow passage, has a concave curvature, which is adjoined by a convex curvature.

In a further configuration, the frontal structured surface of the electrode has only a concave region which imparts only a convex curvature to the periphery of the inlet opening adjacent to the flow passage. In this way, a simple rounding of the periphery of the inlet opening is provided.

In general, it is the case that, with the method according to the invention, a multiplicity of shaping operations can be performed on the front side of the pre-swirl nozzle carrier, which operations structure the periphery of the inlet opening.

In a further configuration, the electrode has a front section and a rear section which is widened in relation to the front section, wherein the frontal structured surface is formed on said rear section. Here, it may be provided that a conically widening section is formed between the front section and the rear section. Accordingly, the flow passage forms, adjacent to the inlet opening, a section in which the flow passage conically narrows in a flow direction.

As noted elsewhere herein, the present disclosure may relate to a gas turbine engine. Such a gas turbine engine may comprise an engine core which comprises a turbine, a combustion chamber, a compressor, and a core shaft that connects the turbine to the compressor. Such a gas turbine engine may comprise a fan (having fan blades) which is positioned upstream of the engine core.

Arrangements of the present disclosure can be particularly, although not exclusively, beneficial for fans that are driven via a gear box. Accordingly, the gas turbine engine may comprise a gear box that receives an input from the core shaft and outputs drive for the fan so as to drive the fan at a lower rotational speed than the core shaft. The input to the gear box may be performed directly from the core shaft or indirectly from the core shaft, for example via a spur shaft and/or a spur gear. The core shaft may be rigidly connected to the turbine and the compressor, such that the turbine and the compressor rotate at the same rotational speed (wherein the fan rotates at a lower rotational speed).

The gas turbine engine as described and/or claimed herein may have any suitable general architecture. For example, the gas turbine engine may have any desired number of shafts, for example one, two or three shafts, that connect turbines and compressors. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft which connects the second turbine to the second compressor. The second turbine, second compressor and second core shaft may be arranged so as to rotate at a higher rotational speed than the first core shaft.

In such an arrangement, the second compressor may be positioned so as to be axially downstream of the first compressor. The second compressor may be arranged so as to receive (for example directly receive, for example via a generally annular duct) flow from the first compressor.

The gear box may be arranged so as to be driven by that core shaft (for example the first core shaft in the example above) which is configured to rotate (for example during use) at the lowest rotational speed. For example, the gear box may be arranged so as to be driven only by that core shaft (for example only by the first core shaft, and not the second core shaft, in the example above) which is configured to rotate (for example during use) at the lowest rotational speed. Alternatively thereto, the gear box may be arranged so as to be driven by one or a plurality of shafts, for example the first and/or the second shaft in the example above.

In the case of a gas turbine engine as described and/or claimed herein, a combustion chamber may be provided axially downstream of the fan and of the compressor(s). For example, the combustion chamber can lie directly downstream of the second compressor (for example at the exit of the latter), if a second compressor is provided. By way of further example, the flow at the exit of the compressor may be supplied to the inlet of the second turbine, if a second turbine is provided. The combustion chamber may be provided upstream of the turbine(s).

The or each compressor (for example the first compressor and the second compressor as described above) may comprise any number of stages, for example multiple stages. Each stage may comprise a row of rotor blades and a row of stator vanes, which may be variable stator vanes (in the sense that the angle of incidence of said variable stator vanes may be variable). The row of rotor blades and the row of stator vanes may be axially offset from one another.

The or each turbine (for example the first turbine and the second turbine as described above) may comprise any number of stages, for example multiple stages. Each stage may comprise a row of rotor blades and a row of stator vanes. The row of rotor blades and the row of stator vanes may be axially offset from one another.

Each fan blade may be defined as having a radial span width extending from a root (or a hub) at a radially inner location flowed over by gas, or at a 0% span width position, to a tip at a 100% span width position. The ratio of the radius of the fan blade at the hub to the radius of the fan blade at the tip may be less than (or of the order of): 0.4, 0.39, 0.38, 0.37, 0.36, 0.35, 0.34, 0.33, 0.32, 0.31, 0.3, 0.29, 0.28, 0.27, 0.26 or 0.25. The ratio of the radius of the fan blade at the hub to the radius of the fan blade at the tip may be in an inclusive range delimited by two of the values in the previous sentence (that is to say that the values may form upper or lower limits). These ratios may be referred to in general as the hub-to-tip ratio. The radius at the hub and the radius at the tip can both be measured at the leading periphery part (or the axially frontmost periphery) of the blade. The hub-to-tip ratio refers, of course, to that portion of the fan blade which is flowed over by gas, that is to say the portion that is situated radially outside any platform.

The radius of the fan can be measured between the engine centerline and the tip of the fan blade at the leading periphery of the latter. The diameter of the fan (which can simply be double the radius of the fan) may be larger than (or of the order of): 250 cm (approximately 100 inches), 260 cm, 270 cm (approximately 105 inches), 280 cm (approximately 110 inches), 290 cm (approximately 115 inches), 300 cm (approximately 120 inches), 310 cm, 320 cm (approximately 125 inches), 330 cm (approximately 130 inches), 340 cm (approximately 135 inches), 350 cm, 360 cm (approximately 140 inches), 370 cm (approximately 145 inches), 380 cm (approximately 150 inches), or 390 cm (approximately 155 inches). The fan diameter may be in an inclusive range delimited by two of the values in the previous sentence (that is to say that the values may form upper or lower limits).

The rotational speed of the fan may vary during use. Generally, the rotational speed is lower for fans with a comparatively large diameter. Purely by way of non-limiting example, the rotational speed of the fan under cruise conditions may be less than 2500 rpm, for example less than 2300 rpm. Purely by way of a further non-limiting example, the rotational speed of the fan under cruise conditions for an engine having a fan diameter in the range from 250 cm to 300 cm (for example 250 cm to 280 cm) may also be in the range from 1700 rpm to 2500 rpm, for example in the range from 1800 rpm to 2300 rpm, for example in the range from 1900 rpm to 2100 rpm. Purely by way of a further non-limiting example, the rotational speed of the fan under cruise conditions for an engine having a fan diameter in the range from 320 cm to 380 cm may be in the range from 1200 rpm to 2000 rpm, for example in the range from 1300 rpm to 1800 rpm, for example in the range from 1400 rpm to 1600 rpm.

During use of the gas turbine engine, the fan (with associated fan blades) rotates about an axis of rotation. This rotation results in the tip of the fan blade moving with a velocity $U_{tip}$. The work done by the fan blades on the flow results in an enthalpy rise dH in the flow. A fan tip loading can be defined as $dH/U_{tip}^2$, where dH is the enthalpy rise (for example the 1-D average enthalpy rise) across the fan and $U_{tip}$ is the (translational) velocity of the fan tip, for example at the leading periphery of the tip (which can be defined as the fan tip radius at the leading periphery multiplied by the angular velocity). The fan tip loading at cruise conditions may be more than (or of the order of): 0.3, 0.31, 0.32, 0.33, 0.34, 0.35, 0.36, 0.37, 0.38, 0.39, or 0.4 (wherein all units in this passage are $Jkg^{-1}K^{-1}/(ms^{-1})^2$). The fan tip loading may be in an inclusive range delimited by two of the values in the previous sentence (that is to say that the values may form upper or lower limits).

Gas turbine engines in accordance with the present disclosure can have any desired bypass ratio, where the bypass ratio is defined as the ratio of the mass flow rate of the flow through the bypass duct to the mass flow rate of the flow through the core at cruise conditions. In the case of some arrangements, the bypass ratio can be more than (or of the order of): 10, 10.5, 11, 11.5, 12, 12.5, 13, 13.5, 14, 14.5, 15, 15.5, 16, 16.5, or 17. The bypass ratio may be in an inclusive range delimited by two of the values in the previous sentence (that is to say that the values may form upper or lower limits). The bypass duct may be substantially annular. The bypass duct may be situated radially outside the engine core. The radially outer surface of the bypass duct may be defined by an engine nacelle and/or a fan casing.

The overall pressure ratio of a gas turbine engine as described and/or claimed herein can be defined as the ratio of the stagnation pressure upstream of the fan to the stagnation pressure at the exit of the highest pressure compressor (before entry into the combustion chamber). As a non-limiting example, the overall pressure ratio of a gas turbine engine as described and/or claimed herein at cruising speed may be greater than (or of the order of): 35, 40, 45, 50, 55, 60, 65, 70, 75. The overall pressure ratio may be in an inclusive range delimited by two of the values in the previous sentence (that is to say that the values may form upper or lower limits).

The specific thrust of an engine can be defined as the net thrust of the engine divided by the total mass flow through the engine. The specific thrust of an engine as described and/or claimed herein at cruise conditions may be less than (or of the order of): 110 $Nkg^{-1}s$, 105 $Nkg^{-1}s$, 100 $Nkg^{-1}s$, 95 $Nkg^{-1}s$, 90 $Nkg^{-1}s$, 85 $Nkg^{-1}s$ or 80 $Nkg^{-1}s$. The specific thrust may be in an inclusive range delimited by two of the values in the previous sentence (that is to say that the values may form upper or lower limits). Such engines can be particularly efficient in comparison with conventional gas turbine engines.

A gas turbine engine as described and/or claimed herein may have any desired maximum thrust. Purely by way of a non-limiting example, a gas turbine as described and/or claimed herein may be capable of generating a maximum thrust of at least (or of the order of): 160 kN, 170 kN, 180 kN, 190 kN, 200 kN, 250 kN, 300 kN, 350 kN, 400 kN, 450 kN, 500 kN, or 550 kN. The maximum thrust may be in an inclusive range delimited by two of the values in the previous sentence (that is to say that the values may form upper or lower limits). The thrust referred to above may be the maximum net thrust at standard atmospheric conditions at sea level plus 15 degrees C. (ambient pressure 101.3 kPa, temperature 30 degrees C.) in the case of a static engine.

During use, the temperature of the flow at the entry to the high-pressure turbine can be particularly high. This temperature, which can be referred to as TET, may be measured at the exit to the combustion chamber, for example directly upstream of the first turbine blade, which in turn can be referred to as a nozzle guide blade. At cruising speed, the TET may be at least (or of the order of): 1400 K, 1450 K, 1500 K, 1550 K, 1600 K, or 1650 K. The TET at constant speed may be in an inclusive range delimited by two of the values in the previous sentence (that is to say that the values may form upper or lower limits). The maximum TET in the use of the engine may be at least (or of the order of), for example: 1700 K, 1750 K, 1800 K, 1850 K, 1900 K, 1950 K, or 2000 K. The maximum TET may be in an inclusive range delimited by two of the values in the previous sentence (that is to say that the values may form upper or lower limits). The maximum TET may occur, for example, under a high thrust condition, for example under a maximum take-off thrust (MTO) condition.

A fan blade and/or an airfoil portion of a fan blade described and/or claimed herein may be manufactured from any suitable material or a combination of materials. For example, at least a part of the fan blade and/or of the airfoil can be manufactured at least in part from a composite, for example a metal matrix composite and/or an organic matrix composite, such as carbon fiber. By way of further example, at least a part of the fan blade and/or of the airfoil can be manufactured at least in part from a metal, such as a titanium-based metal or an aluminum-based material (such as an aluminum-lithium alloy) or a steel-based material. The fan blade may comprise at least two regions which are manufactured using different materials. For example, the fan blade may have a protective leading periphery, which is manufactured using a material that is better able to resist impact (for example of birds, ice, or other material) than the rest of the blade. Such a leading periphery may, for example, be manufactured using titanium or a titanium-based alloy. Thus, purely by way of example, the fan blade may have a carbon-fiber-based or aluminum-based body (such as an aluminum-lithium alloy) with a titanium leading periphery.

A fan as described and/or claimed herein may comprise a central portion, from which the fan blades may extend, for example in a radial direction. The fan blades may be attached to the central portion in any desired manner. For example, each fan blade may comprise a fixing device which can engage with a corresponding slot in the hub (or disk). Purely by way of example, such a fixing device may be in the form of a dovetail that can be inserted into and/or engage with a corresponding slot in the hub/disk in order for the fan blade to be fixed to the hub/disk. By way of further example, the fan blades can be formed integrally with a central portion. Such an arrangement may be referred to as a blisk or a bling. Any suitable method may be used to manufacture such a blisk or such a bling. For example, at least a part of the fan blades can be machined from a block and/or at least a part of the fan blades can be attached to the hub/disk by welding, such as linear friction welding, for example.

The gas turbine engines described and/or claimed herein may or may not be provided with a variable area nozzle (VAN). Such a variable area nozzle can allow the exit cross section of the bypass duct to be varied during use. The general principles of the present disclosure can apply to engines with or without a VAN.

The fan of a gas turbine as described and/or claimed herein may have any desired number of fan blades, for example 16, 18, 20 or 22 fan blades.

As used herein, cruise conditions can mean cruise conditions of an aircraft to which the gas turbine engine is attached. Such cruise conditions can be conventionally defined as the conditions at mid-cruise, for example the conditions experienced by the aircraft and/or the engine between (in terms of time and/or distance) the top of climb and the start of descent.

Purely by way of example, the forward speed at the cruise condition can be any point in the range of from Mach 0.7 to 0.9, for example 0.75 to 0.85, for example 0.76 to 0.84, for example 0.77 to 0.83, for example 0.78 to 0.82, for example 0.79 to 0.81, for example in the magnitude of Mach 0.8, in the magnitude of Mach 0.85 or in the range of from 0.8 to 0.85. Any arbitrary speed within these ranges can be the constant cruise condition. In the case of some aircraft, the constant cruise conditions may be outside these ranges, for example below Mach 0.7 or above Mach 0.9.

Purely by way of example, the cruise conditions may correspond to standard atmospheric conditions at an altitude that is in the range from 10,000 m to 15,000 m, for example in the range from 10,000 m to 12,000 m, for example in the range from 10,400 m to 11,600 m (around 38,000 ft), for example in the range from 10,500 m to 11,500 m, for example in the range from 10,600 m to 11,400 m, for example in the range from 10,700 m (around 35,000 ft) to 11,300 m, for example in the range from 10,800 m to 11,200 m, for example in the range from 10,900 m to 11,100 m, for example of the order of 11,000 m. The cruise conditions may correspond to standard atmospheric conditions at any given altitude in these ranges.

Purely by way of example, the cruise conditions may correspond to the following: a forward Mach number of 0.8; a pressure of 23,000 Pa; and a temperature of −55 degrees C.

As used anywhere herein, "cruising speed" or "cruise conditions" may mean the aerodynamic design point. Such an aerodynamic design point (or ADP) may correspond to the conditions (including, for example, the Mach number, environmental conditions, and thrust requirement) for which the fan operation is designed. This may mean, for example, the conditions under which the fan (or the gas turbine engine) has the optimum efficiency in terms of construction.

In use, a gas turbine engine described and/or claimed herein can operate at the cruise conditions defined elsewhere herein. Such cruise conditions can be determined by the cruise conditions (for example the mid-cruise conditions) of an aircraft to which at least one (for example 2 or 4) gas turbine engine can be fastened in order to provide the thrust force.

It is self-evident to a person skilled in the art that a feature or parameter described in relation to one of the above aspects can be applied to any other aspect, unless these are mutually exclusive. Furthermore, any feature or any parameter described here may be applied to any aspect and/or combined with any other feature or parameter described here, unless these are mutually exclusive.

The invention will be explained in more detail below on the basis of a plurality of exemplary embodiments with reference to the figures of the drawing. In the drawing.

Figure 5:
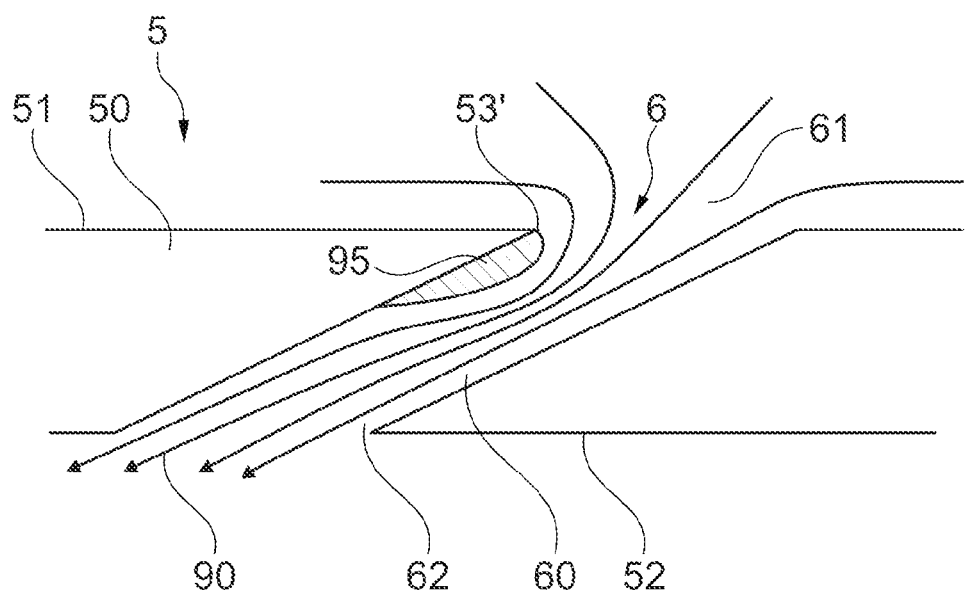
Figure 6:
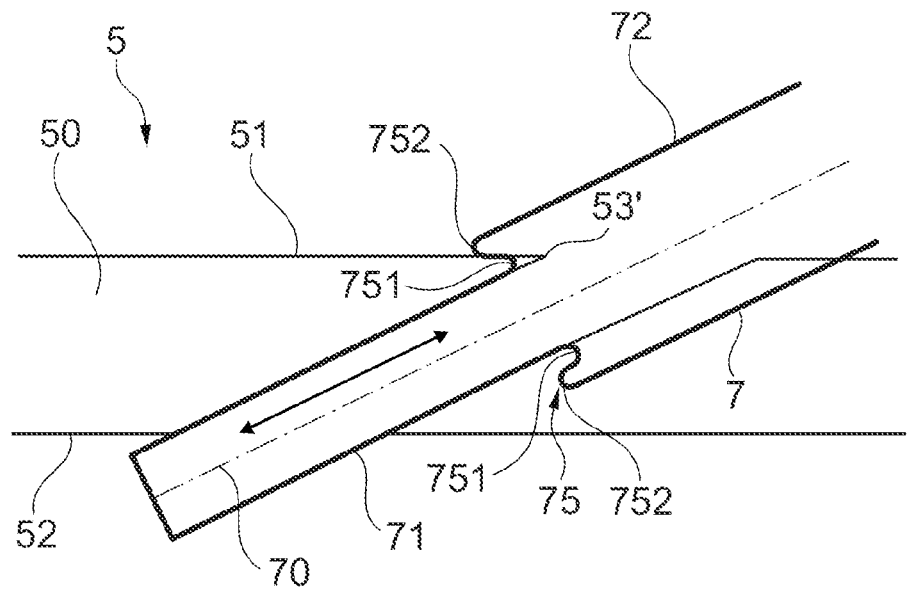
Figure 7:
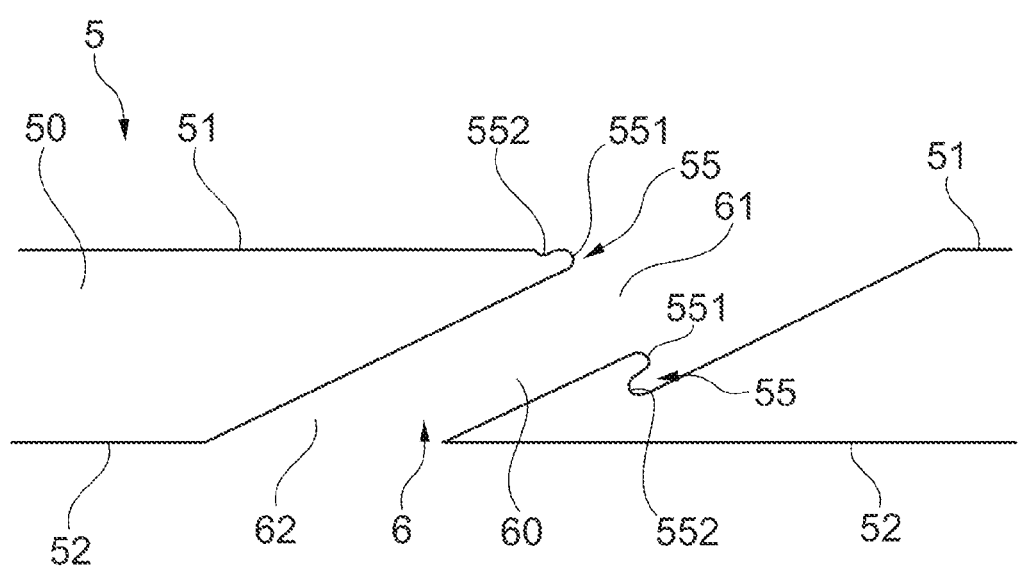
Figure 8:
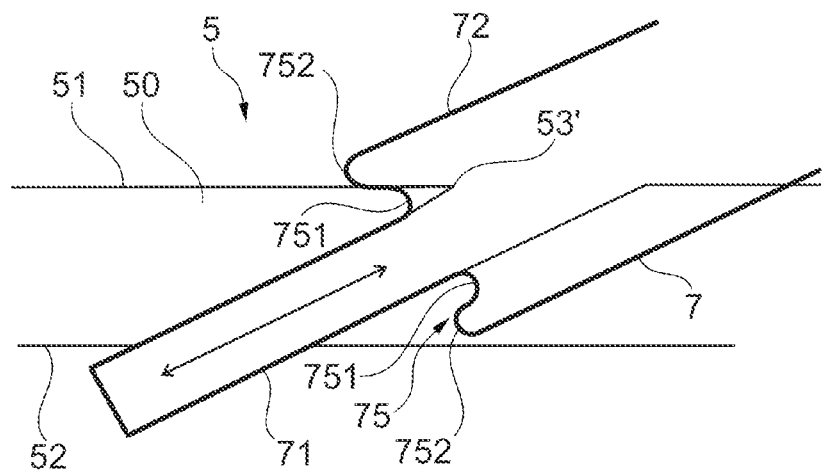
Figure 9:
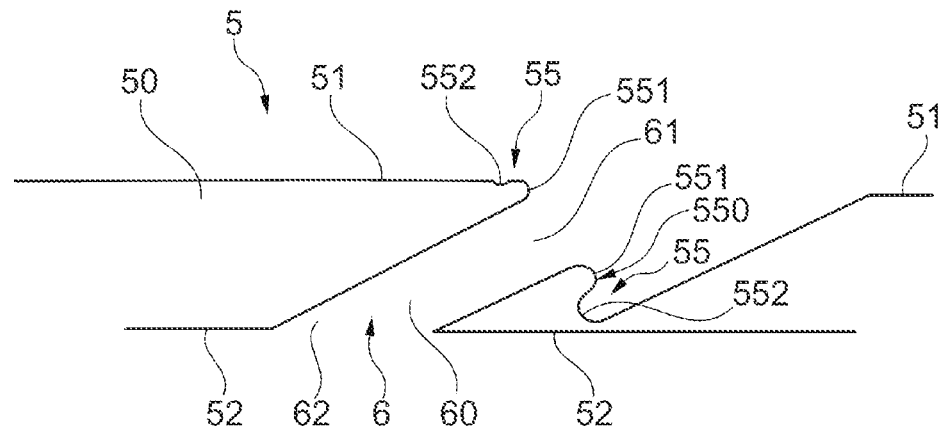
Figure 10:
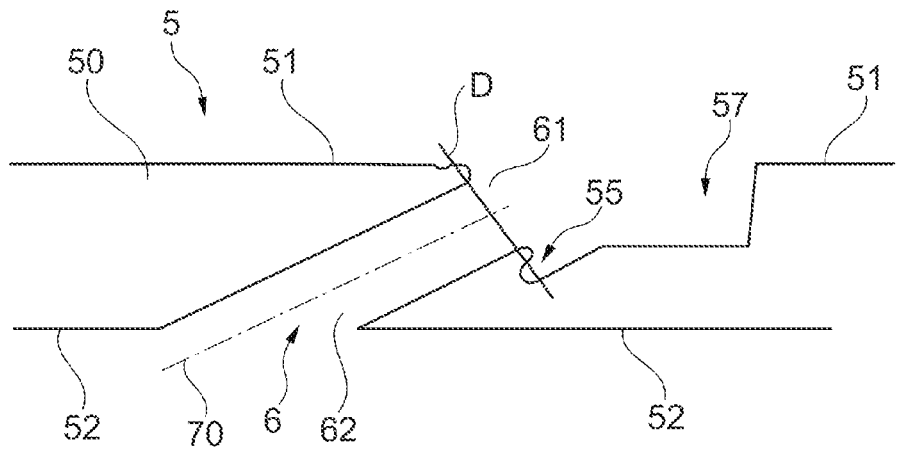
Figure 11:
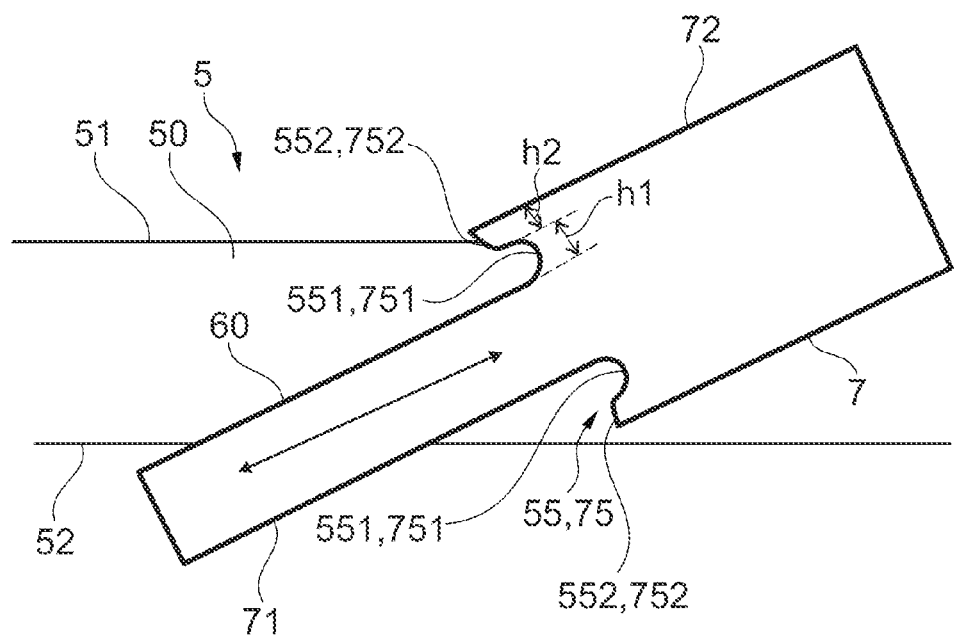
Figure 12:
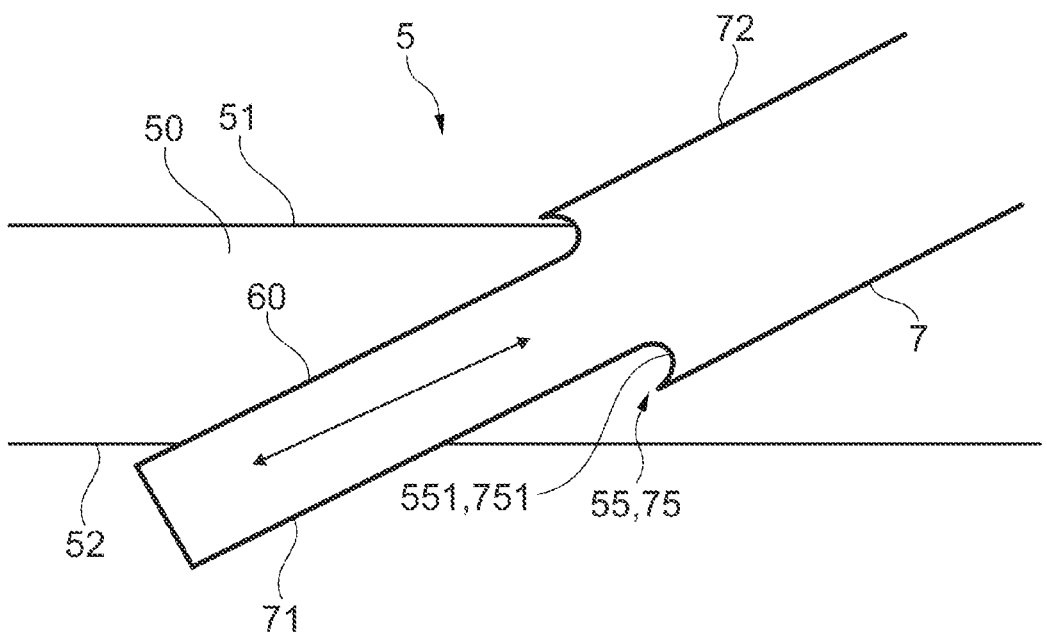
Figure 13:
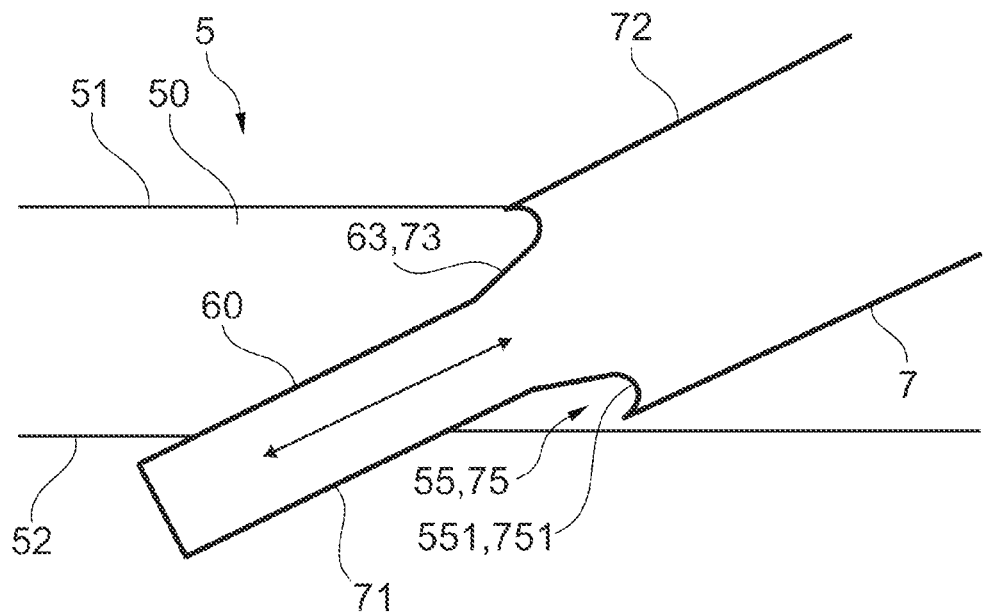
Figure 14:
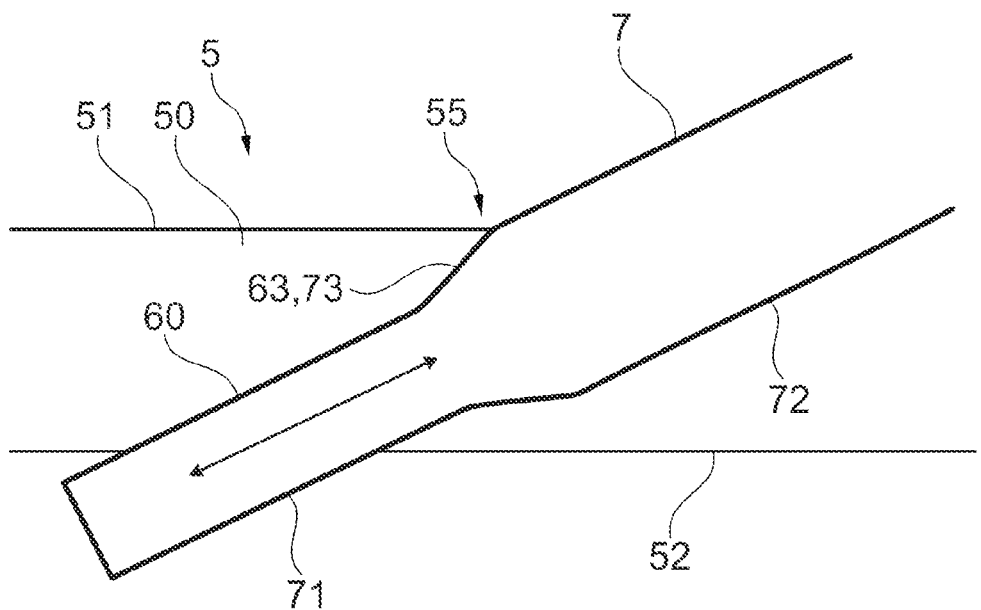
Figure 15:
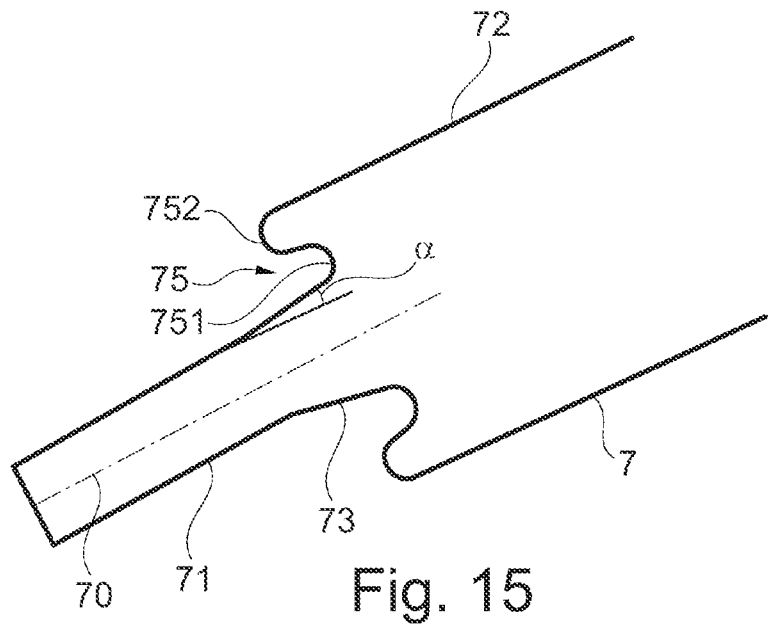
Figure 16:
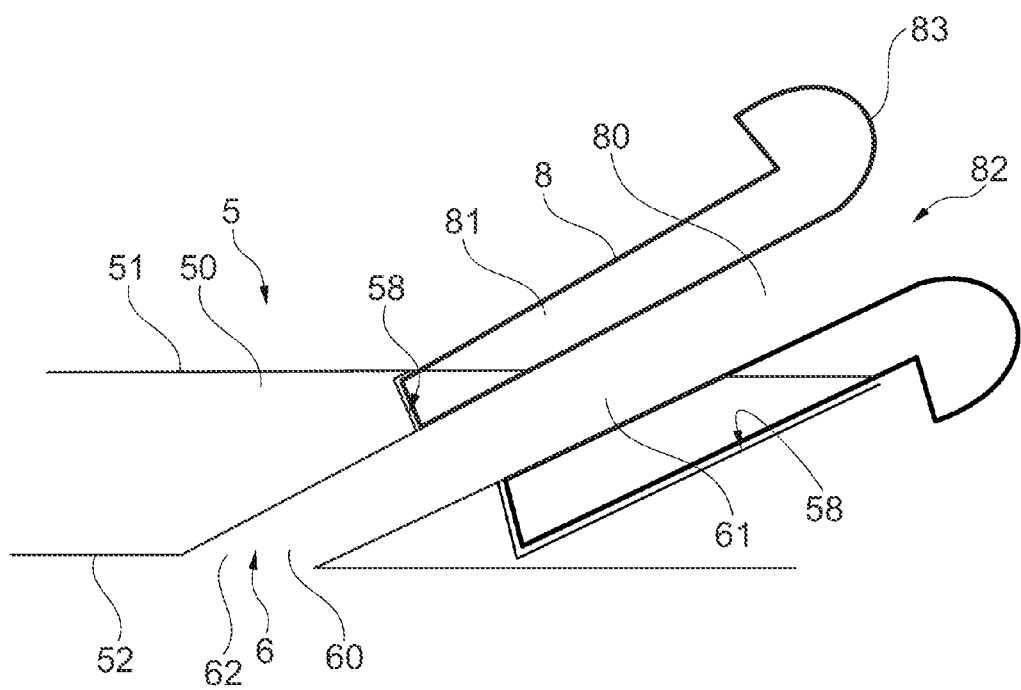
Figure 17:
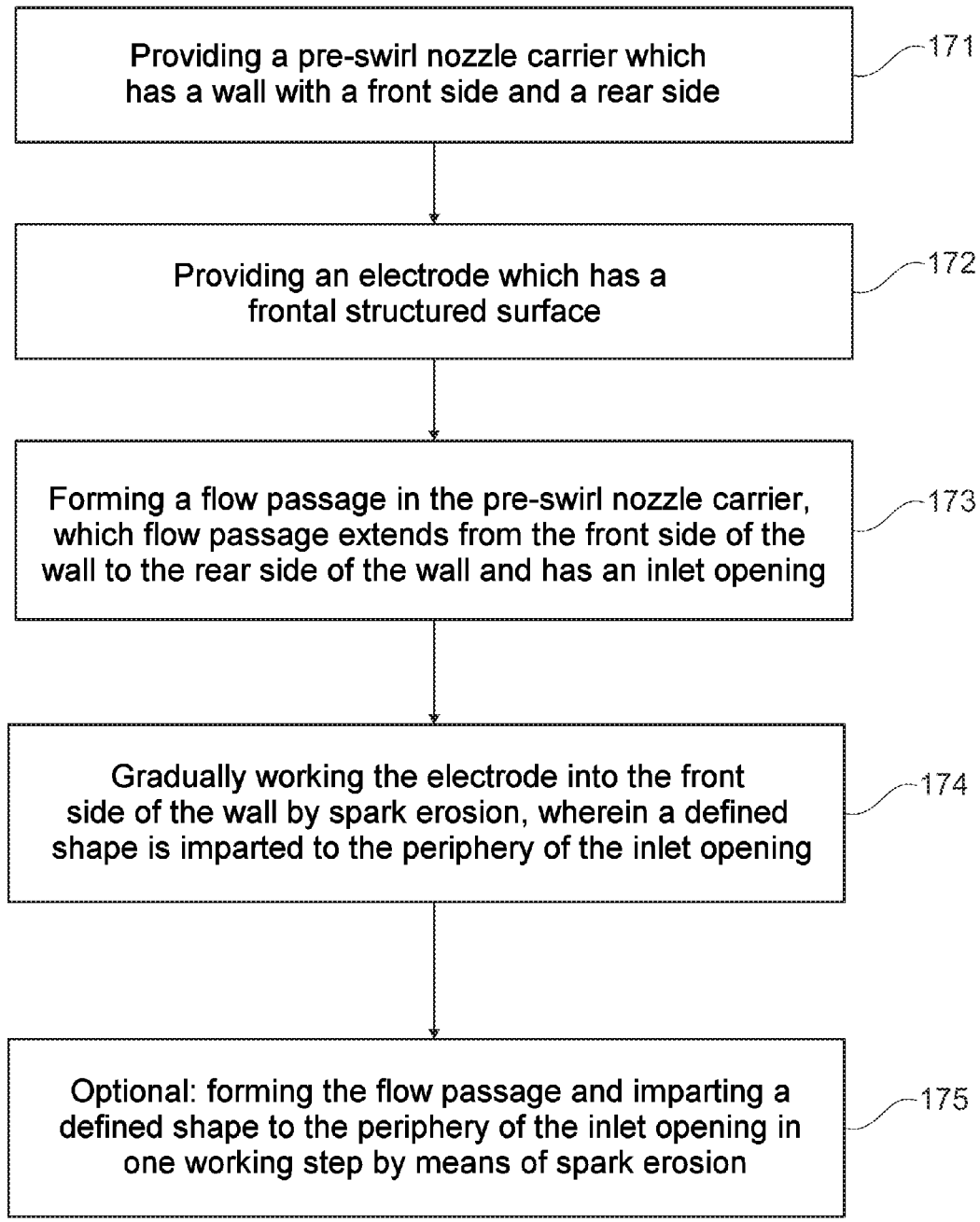

FIG. 5 schematically shows a pre-swirl nozzle according to the prior art;

FIG. 6 schematically shows, in longitudinal section, the formation of a pre-swirl nozzle in a pre-swirl nozzle carrier using an electrode, with the electrode forming a flow passage in the wall of the pre-swirl nozzle carrier by spark erosion and in so doing imparting a defined shape to the periphery of the inlet opening of the flow passage, with the periphery being provided with a convex curvature and a concave curvature;

FIG. 7 shows a pre-swirl nozzle formed in a pre-swirl nozzle carrier in accordance with FIG. 6, wherein the periphery of the inlet opening has a convex curvature and a concave curvature;

FIG. 8 shows the formation of a pre-swirl nozzle in a pre-swirl nozzle carrier using an electrode corresponding to FIG. 6, wherein the convex curvature and the concave curvature of the periphery have a larger radius in relation to the configuration of FIG. 6;

FIG. 9 shows a pre-swirl nozzle formed in a pre-swirl nozzle carrier in accordance with FIG. 8, wherein the periphery of the inlet opening has a convex curvature and a concave curvature;

FIG. 10 shows a pre-swirl nozzle formed in a pre-swirl nozzle carrier corresponding to FIG. 7, wherein, in the front side of the wall of the pre-swirl nozzle carrier, there is additionally formed a cutout which is adjacent to the periphery of the inlet opening;

FIG. 11 shows the formation of a pre-swirl nozzle in a pre-swirl nozzle carrier using an electrode corresponding to FIG. 6, with a shape which has a semicircular convex curvature and a quadrant-shaped concave curvature being imparted to the periphery of the inlet opening of the flow passage;

FIG. 12 shows the formation of a pre-swirl nozzle in a pre-swirl nozzle carrier using an electrode corresponding to FIG. 6, with a convex shape being imparted to the periphery of the inlet opening of the flow passage;

FIG. 13 shows the formation of a pre-swirl nozzle in a pre-swirl nozzle carrier using an electrode corresponding to FIG. 6, with a conical shape being imparted to the flow passage adjacent to the inlet opening and a convex section being imparted to the periphery of the inlet opening;

FIG. 14 shows the formation of a pre-swirl nozzle in a pre-swirl nozzle carrier using an electrode corresponding to FIG. 6, with a conical shape being imparted to the flow passage adjacent to the inlet opening;

FIG. 15 shows an electrode for the spark erosion process, which electrode has a front section, a rear section which is widened in relation to the front section, and a section of conical form between the front section and the rear section;

FIG. 16 shows an alternative exemplary embodiment of a pre-swirl nozzle formed in a pre-swirl nozzle carrier, wherein the inlet opening of the pre-swirl nozzle is connected to an inlet funnel which protrudes from the front side of the pre-swirl nozzle carrier; and FIG. 17 shows the procedure of a method for forming a pre-swirl nozzle in a pre-swirl nozzle carrier, with a defined shape being imparted to the periphery of the inlet opening.

Figure 1:
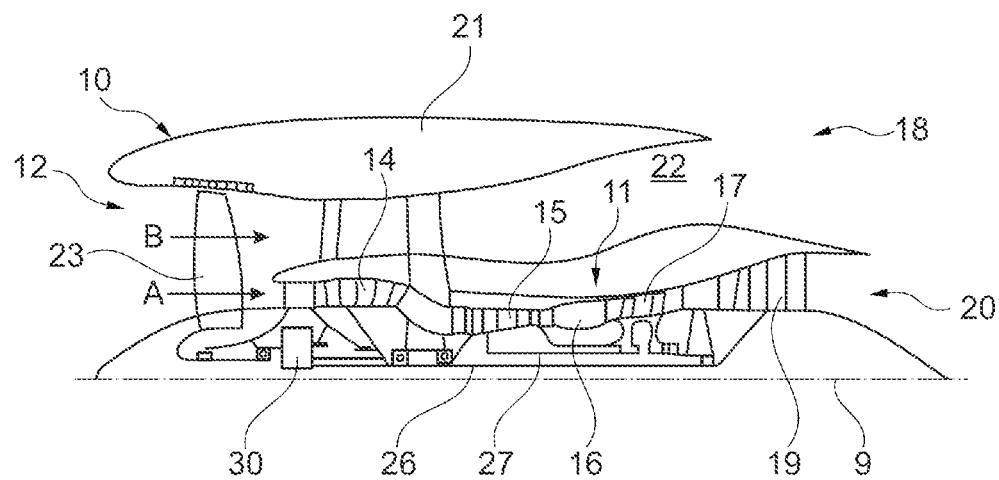
FIG. 1 shows a lateral sectional view of a gas turbine engine.

FIG. 1 illustrates a gas turbine engine 10 having a main axis of rotation 9. The engine 10 comprises an air intake 12 and a thrust fan 23 that generates two air flows: a core air flow A and a bypass air flow B. The gas turbine engine 10 comprises a core 11 which receives the core air flow A. In the sequence of axial flow, the engine core 11 comprises a low-pressure compressor 14, a high-pressure compressor 15, a combustion device 16, a high-pressure turbine 17, a low-pressure turbine 19, and a core thrust nozzle 20. An engine nacelle 21 surrounds the gas turbine engine 10 and defines a bypass duct 22 and a bypass thrust nozzle 18. The bypass air flow B flows through the bypass duct 22. The fan 23 is attached to and driven by the low-pressure turbine 19 by way of a shaft 26 and an epicyclic gear box 30.

During use, the core air flow A is accelerated and compressed by the low-pressure compressor 14 and directed into the high-pressure compressor 15, where further compression takes place. The compressed air expelled from the high-pressure compressor 15 is directed into the combustion device 16, where it is mixed with fuel and the mixture is combusted. The resulting hot combustion products then propagate through the high-pressure and the low-pressure turbines 17, 19 and thereby drive said turbines, before being expelled through the nozzle 20 to provide a certain propulsive thrust. The high-pressure turbine 17 drives the high-pressure compressor 15 by means of a suitable connecting shaft 27. The fan 23 generally provides the major part of the thrust force. The epicyclic gear box 30 is a reduction gear box.

Figure 2:
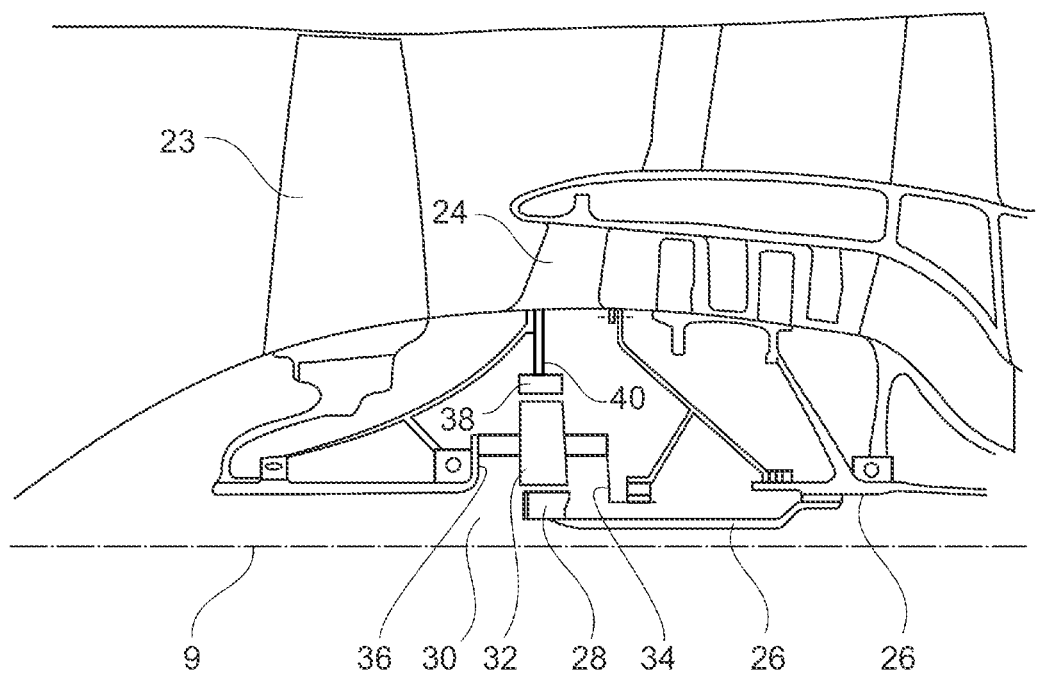
FIG. 2 shows a close-up lateral sectional view of an upstream portion of a gas turbine engine.

An exemplary arrangement for a geared fan gas turbine engine 10 is shown in FIG. 2. The low-pressure turbine 19 (see FIG. 1) drives the shaft 26, which is coupled to a sun gear 28 of the epicyclic gear box assembly 30. Multiple planet gears 32, which are coupled to one another by a planet carrier 34, are situated radially to the outside of the sun gear 28 and mesh therewith. The planet carrier 34 limits the planet gears 32 to orbiting around the sun gear 28 in a synchronous manner while enabling each planet gear 32 to rotate about its own axis. The planet carrier 34 is coupled by way of linkages 36 to the fan 23 so as to drive the rotation of the latter about the engine axis 9. Radially to the outside of the planet gears 32 and meshing therewith is an external gear or ring gear 38 that is coupled, via linkages 40, to a stationary supporting structure 24.

It is noted that the terms "low-pressure turbine" and "low-pressure compressor" as used herein can be taken to mean the lowest pressure turbine stage and the lowest pressure compressor stage (that is to say not including the fan 23) respectively and/or the turbine and compressor stages that are connected to one another by the connecting shaft 26 with the lowest rotational speed in the engine (that is to say not including the gear box output shaft that drives the fan 23). In some documents, the "low-pressure turbine" and the "low-pressure compressor" referred to herein may alternatively be known as the "intermediate-pressure turbine" and "intermediate-pressure compressor". Where such alternative nomenclature is used, the fan 23 can be referred to as a first compression stage or lowest-pressure compression stage.

Figure 3:
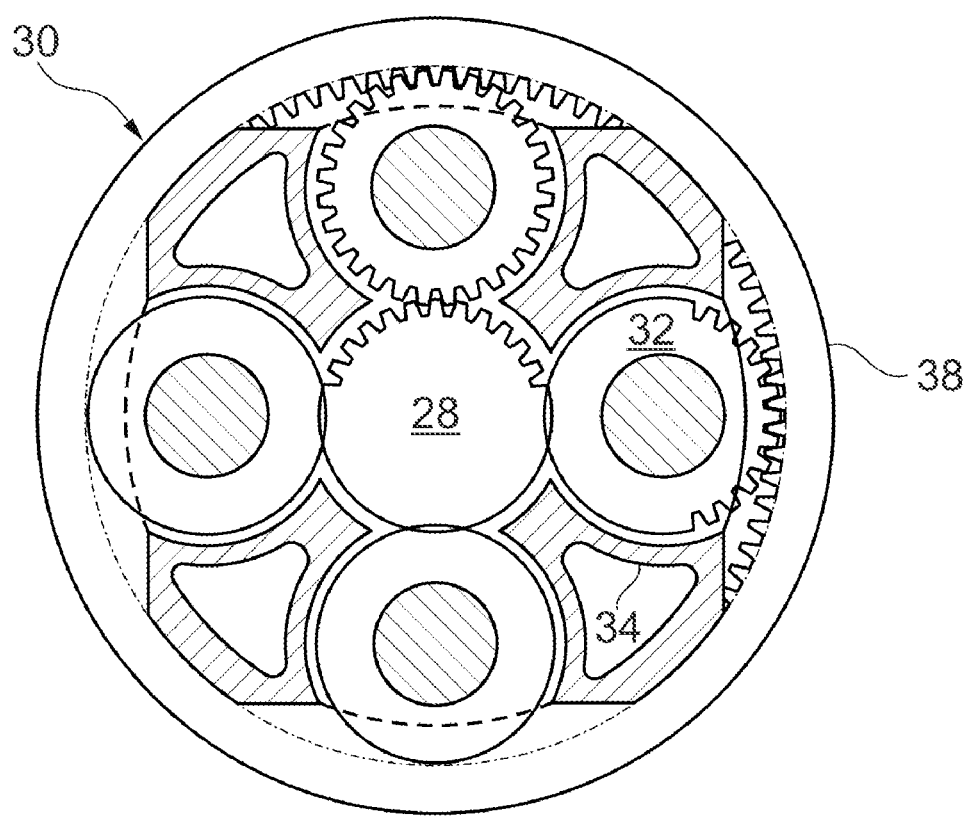
FIG. 3 shows a partially cut-away view of a gear box for a gas turbine engine.

The epicyclic gear box 30 is shown in an exemplary manner in greater detail in FIG. 3. Each of the sun gear 28, the planet gears 32 and the ring gear 38 comprise teeth about their periphery to mesh with the other gears. However, for clarity, only exemplary portions of the teeth are illustrated in FIG. 3. Although four planet gears 32 are illustrated, it will be apparent to the person skilled in the art that more or fewer planet gears 32 may be provided within the scope of protection of the claimed invention. Practical applications of an epicyclic gear box 30 generally comprise at least three planet gears 32.

The epicyclic gear box 30 illustrated by way of example in FIGS. 2 and 3 is a planetary gear box, in that the planet carrier 34 is coupled to an output shaft via linkages 36, wherein the ring gear 38 is fixed. However, any other suitable type of epicyclic gear box 30 can be used. By way of further example, the epicyclic gear box 30 can be a star arrangement, in which the planet carrier 34 is held so as to be fixed, wherein the ring gear (or annulus) 38 is allowed to rotate. In the case of such an arrangement, the fan 23 is driven by the ring gear 38. As a further alternative example, the gear box 30 can be a differential gear box in which both the ring gear 38 and the planet carrier 34 are allowed to rotate.

It will be appreciated that the arrangement shown in FIGS. 2 and 3 is by way of example only, and various alternatives are within the scope of protection of the present disclosure. Purely by way of example, any suitable arrangement can be used for positioning the gear box 30 in the engine 10 and/or for connecting the gear box 30 to the engine 10. By way of a further example, the connections (such as the linkages 36, 40 in the example of FIG. 2) between the gear box 30 and other parts of the engine 10 (such as the input shaft 26, the output shaft and the fixed structure 24) may have a certain degree of stiffness or flexibility. By way of a further example, any suitable arrangement of the bearings between rotating and stationary parts of the engine (for example between the input and output shafts of the gear box and the fixed structures, such as the gear box casing) may be used, and the disclosure is not limited to the exemplary arrangement of FIG. 2. For example, where the gear mechanism 30 has a star arrangement (described above), the person skilled in the art would readily understand that the arrangement of output and support linkages and bearing positions would typically be different to that shown by way of example in FIG. 2.

Accordingly, the present disclosure extends to a gas turbine engine having an arbitrary arrangement of gear box types (for example star-shaped or planetary), support structures, input and output shaft arrangement, and bearing positions.

Optionally, the gear box may drive additional and/or alternative components (e.g. the intermediate-pressure compressor and/or a booster compressor).

Other gas turbine engines in which the present disclosure can be used may have alternative configurations. For example, such engines may have an alternative number of compressors and/or turbines and/or an alternative number of connecting shafts. By way of a further example, the gas turbine engine shown in FIG. 1 has a split flow nozzle 20, 22, meaning that the flow through the bypass duct 22 has its own nozzle that is separate from and radially outside the core engine nozzle 20. However, this is not restrictive, and any aspect of the present disclosure can also apply to engines in which the flow through the bypass duct 22 and the flow through the core 11 are mixed or combined before (or upstream of) a single nozzle, which may be referred to as a mixed flow nozzle. One or both nozzles (whether mixed or split flow) can have a fixed or variable area. Although the example described relates to a turbofan engine, the disclosure can be applied, for example, to any type of gas turbine engine, such as, for example, an open rotor engine (in which the fan stage is not surrounded by an engine nacelle) or a turboprop engine. In some arrangements, the gas turbine engine 10 may not comprise a gear box 30.

The geometry of the gas turbine engine 10, and components thereof, is/are defined by a conventional axis system, comprising an axial direction (which is aligned with the axis of rotation 9), a radial direction (in the bottom-to-top direction in FIG. 1), and a circumferential direction (perpendicular to the view in FIG. 1). The axial, radial and circumferential directions run so as to be mutually perpendicular.

In the context of the present invention, the cooling of the high-pressure turbine of a gas turbine engine is of importance, for example the cooling of the high-pressure turbine 17 of FIG. 1. For the cooling of the high-pressure turbine, cooling air is branched off from the compressor, which cooling air is used for cooling the rotor of the high-pressure turbine. In order to set the cooling air in rotation, it passes through so-called pre-swirl nozzles, which divert the cooling air in the direction of the rotor and accelerate said cooling air. The present invention is concerned with such pre-swirl nozzles.

Figure 4:
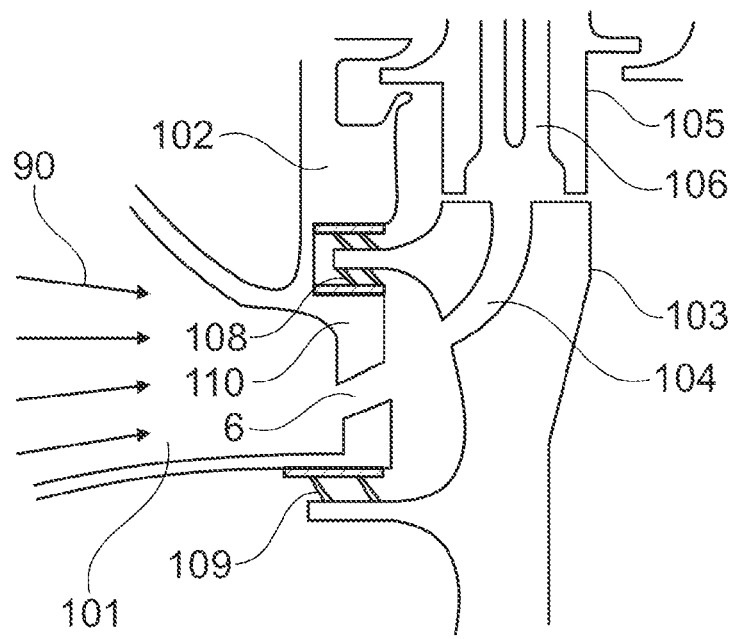
FIG. 4 shows, by way of example, parts of a high-pressure turbine of a gas turbine engine in which pre-swirl nozzles are used to impart swirl to cooling air.

FIG. 4 illustrates, by way of example, the use of pre-swirl nozzles in a high-pressure turbine. The high-pressure turbine comprises a first turbine stage, which comprises a stator (the inlet guide wheel, also referred to as NGV ("Nozzle Guide Vane")) and a rotor. FIG. 4 shows static wall elements 102, 110 of the stator and a rotating turbine disk 103 and a blade root 105 of the rotor. The guide vanes of the stator and the rotor blades of the rotor, which extend in the main flow path of the high-pressure turbine, are not visible in FIG. 4. The components illustrated in FIG. 4 are situated radially at the inside in relation to the main flow path.

Cooling air 90 is provided from the compressor of the gas turbine engine via a cooling air duct 101. The cooling air 90 passes through pre-swirl nozzles 6 which are formed in the wall element 110. The wall element 110 thus constitutes a pre-swirl nozzle carrier. In the pre-swirl nozzles 6, the cooling air is diverted and has swirl imparted to it in the direction of rotation of the turbine disk 103. Ideally, the cooling air has swirl imparted to it such that the direction and magnitude of its velocity correspond to the path velocity of the turbine disk 103 (in the radial region under consideration), in which case particularly effective cooling is realized. In order that swirl of the cooling air is realized, the pre-swirl nozzles 6 are formed obliquely, that is to say with a directional component in a circumferential direction, in the wall element 110.

The air blown out from the pre-swirl nozzles 6 enters a cooling air duct 104, which is formed in the rotating turbine disk 103. From the cooling air duct 104, the air enters cooling air ducts 106 which are formed in the blade root 105 of the rotor blades of the rotor and cool these. Seals 108, 109 are arranged between the turbine disk 103 and the wall elements 102, 110.

It is pointed out that the cooling air introduced from the compressor may form further air flows, for example a further air flow that cools the outer side of the turbine disk. Likewise, the cooling air may be fed to the rotor blades through alternative ducts, for example at the interface between turbine disk and rotor blades. For such further air flows, too, pre-swirl nozzles may be formed in corresponding wall sections.

FIG. 5 schematically shows a pre-swirl nozzle carrier 5, with pre-swirl nozzles 6 formed therein, according to the prior art. According to said figure, the pre-swirl nozzle carrier 5 comprises a wall 50 which has a front side 51 and a rear side 52. In the wall 50, there are formed a multiplicity of pre-swirl nozzles 6, which each have a flow passage 60. The flow passages 60 extends in each case from the front side 51 of the wall 50 to the rear side 52 of the wall 50. Said flow passage comprises an inlet opening 61 at the front side 51 of the wall 50 and an outlet opening 62 at the rear side 52 of the wall 50. Here, the flow passage 60 are formed such that air flowing in via the inlet opening is blown out of the outlet opening 62 with a directional component in a direction of rotation of a rotor adjacent to the pre-swirl nozzle carrier, for example of the rotor 103 of FIG. 4. For this purpose, the flow passage 60 runs for example obliquely in the wall 50, such that the inlet opening 61 and the outlet opening 62 are arranged offset with respect to one another.

The inlet opening 61 of the flow passage 60 is delimited by a periphery which is in the form of a sharp edge 53'. This has the effect that the inflowing air 90 forms a separation bubble 95 in the flow passage 60 downstream of the edge 53'. Said separation bubble reduces the effective narrowest cross section through which air 90 can flow in the flow passage 60, which has the effect that the air 90 flows more slowly downstream of the narrowest effective cross section and accordingly exits the flow passage 60 with a velocity which is reduced in relation to the theoretically attainable velocity. Reduced swirl of the cooling air, and, in association with this, non-optimum cooling of the component that is to be cooled, are accordingly encountered.

It is conceivable for the sharp edge 53' that forms the periphery of the inlet opening 61 to be replaced by a bevel. This duly reduces but does not prevent the formation of a separation bubble 95. It is also difficult from a production aspect to provide a bevel at the periphery of the inlet opening 61 in a defined manner.

FIG. 6 schematically shows, in longitudinal section, the formation of a pre-swirl nozzle 6 in a pre-swirl nozzle carrier 5 using an electrode 7 and spark-erosive machining. FIG. 7 shows, in longitudinal section, the pre-swirl nozzle 6 provided in a pre-swirl nozzle carrier 5 by way of a machining process as per FIG. 6. FIGS. 6 and 7 will be referred to jointly below.

The production of the pre-swirl nozzle 6 is performed using an electrode 7 which has a front section 71 and a rear section 72 which is widened in relation to the front section. The front section 71 and the rear section 72 are for example of cylindrical form. The rear section 72 has a frontal surface 75 which has a structuring. In the illustrated exemplary embodiment, the structuring comprises a radially inner concave region 751 and, adjacent thereto, a radially outer convex region 752.

The electrode 7 is composed of a conductive material, for example copper, brass, graphite or copper alloys, and is held in an electrode tool which is not illustrated in any more detail. The pre-swirl nozzle carrier 6 is likewise composed of a conductive material, such as for example steel or a nickel-based alloy. The removal of material of the wall 50 is performed by flashover of sparks. Here, the front section 71 of the electrode 7 works gradually through from the front side 51 to the rear side 52 of the wall 50, forming the flow passage 60. The spark-erosive machining is performed in a manner known per se, wherein parameters such as voltage, current intensity, impulse, duration, feed, wall spacing and erosion medium are suitably set.

The electrode 7 with the front section 71, with the rear section 72 which is widened in relation to said front section and with the structured frontal surface 75 is, for example, itself produced by turning, milling or erosion.

A periphery 55, structured in a defined manner, of the inlet opening 61 of the flow passage 60 is produced at the same time by virtue of the frontal structured surface 75 of the rear section 72 of the electrode 7 working into the front side 51 of the wall 50, and in so doing imparting a defined shape to the periphery 55 of the inlet opening 61, toward the end of the machining by spark erosion. Here, the shape of the periphery 55 is the negative shape in relation to the frontal surface 75 of the electrode 7. Accordingly, the periphery 55, after being produced, has in the illustrated exemplary embodiment a region 551 with a convex curvature and, adjoining this, a region 552 with a concave curvature. The periphery 55 of the inlet opening 61 is thus of doubly rounded form, with one instance of a convex curvature and one instance of a concave curvature. In longitudinal section, the periphery 55 is of S-shaped form. The formation of a separation bubble is prevented in an effective manner by means of such shaping.

It is pointed out that the illustrations of FIGS. 6 and 7 are merely schematic and exemplary. For example, in FIGS. 6 and 7, the front side 51 and the rear side 52 of the wall 50 are parallel to one another. However, this is not necessarily the case. The wall 50 may basically have any desired profile and may thus also have curved regions. The thickness of the wall 50 may also vary. The wall 50 may be a constituent part of a structure which has a multiplicity of wall regions. It may be formed integrally in such a structure or may be connected to such a structure. Furthermore, the illustration of the flow passage 60 is also merely schematic and exemplary. For example, said flow passage may be of slightly conical form.

It is also pointed out that the flow passage 60 is of rectilinear form in the exemplary embodiment illustrated. This, too, is not imperatively the case. For example, the flow passage 60 may alternatively be curved. Production using an electrode and a method of spark erosion is also possible in such a case if the electrode or the front section 71 thereof is likewise correspondingly curved.

Also illustrated in FIG. 6, merely for the purposes of comparison, is the shaping of the periphery corresponding to the prior art according to FIG. 5 with a sharp edge 53'. The shape of the periphery is self-evidently determined by the electrode 7, and the edge 53' is not actually present. The same applies to FIG. 8.

The cross section of the flow passage 60 is defined by the cross section of the front section 71 of the electrode 7. Said cross section may basically be selected as desired. For example, the cross section is circular or oval.

It may furthermore be provided that the flow passage 60 is altogether of slightly conical design. For this purpose, it is also possible for the front section 71 of the electrode 7 to be of slightly conical design. A slightly conical shape of the flow passage 60 may however also result if the front section 71 is of cylindrical design.

The frontal structured surface 75 of the electrode 7 has, in exemplary embodiments, a structuring which is identical over 360° in a circumferential direction, that is to say is rotationally symmetrical in relation to the longitudinal axis 70 of the electrode 7. Accordingly, the periphery 55 also has a symmetrical shape. A symmetrical form of the surface 75 and of the periphery 55 is however not imperatively the case. Asymmetrical shape configurations may also be implemented.

The longitudinal axis 70 of the electrode 7 equates to the longitudinal axis of the flow passage 60 and, in the exemplary embodiment illustrated, runs rectilinearly. If the electrode 7 and the flow passage 60 are curved, which may be the case in exemplary embodiments, the centerline of the flow passage 60 and of the electrode 7 is defined as the connecting line of all geometrical central points of the cross-sectional areas of the flow passage 60 and of the electrode 7.

FIGS. 8 and 9 show an exemplary embodiment which corresponds to the exemplary embodiment of FIGS. 6 and 7 aside from the fact that the frontal structured surface 75 of the electrode 7 and accordingly also the structured periphery 55 have a greater radial extent. Here, it is the case that both the region 551 with a convex curvature and the region 552 with a concave curvature of the periphery 55 have a greater radial extent.

It can be seen in FIGS. 8 and 9 that, in longitudinal section, the outer boundary line 550 of the edge 55 at least approximately forms a semicircle both in the region 51 of the convex curvature and in the region 552 of the concave curvature. The radius of curvature of said semicircle in this case determines the radial thickness of the respective region 551, 552. The radius of curvature of the semicircles has, for example, a value which lies between 0.1 times and 1.5 times the diameter of the front section 71 of the electrode 7, wherein a greater diameter generally generates less separation.

FIG. 10 shows a further exemplary embodiment of a pre-swirl nozzle carrier 5, in which pre-swirl nozzles 6 and a structured periphery 55 have been formed by means of an electrode 7, corresponding to FIGS. 6 and 8. Here, at the front side 51 of the wall 50, there has additionally been formed an indentation 57 in which the periphery 55 of the inlet opening partially extends. The indentation 57 may serve for pre-aligning cooling air such that it can flow into the flow passage 60 with reduced diversion.

On the basis of FIG. 10, reference will be made to a further structural property of the periphery 55, which is also realized in the configurations of FIGS. 6 to 9. Owing to the oblique alignment of the flow passage 60 and the formation of the periphery 55 in the wall 50 by means of a frontal surface of the electrode, it is the case that the periphery 55 lies in a plane D which runs at an angle with respect to the plane in which the front side 51 of the wall 50 lies. Here, it may be provided that the plane D is perpendicular to the longitudinal axis 70 of the flow passage 60 or deviates only slightly from a perpendicular arrangement with respect to the longitudinal axis 70, for example by at most 30°.

FIGS. 11-15 show further exemplary embodiments of the formation of pre-swirl nozzles in a pre-swirl nozzle carrier 5 using an electrode 7 and a spark-erosive machining process, wherein the electrodes 7 differ in terms of different shape configurations, in particular with regard to the frontal structured surface 75. Here, a separate image of the pre-swirl nozzle carrier 5 after formation of a pre-swirl nozzle 6 by means of the electrode 7, corresponding to the illustrations of FIGS. 7, 9 and 10, will be omitted. It is true in each case that the shape of the pre-swirl nozzle 6 and the shape of the periphery 55 constitute the negative shape of the shape provided by the electrode 7, aside from any minor deviations that may arise as a result of the spark erosion process itself.

Here, the configuration of FIG. 11 is distinguished by the fact that the concave region 751 of the structured surface 75 of the electrode 7 and accordingly also the convex region 551 of the periphery 55 extend over a greater radial thickness h1 than the convex region 752 of the electrode 7 and the concave region 552 of the periphery 55, which extend over a radial thickness h2 smaller than h1. Here, the convex region 551 has for example a semicircular convex curvature, and the concave region 552 has a quadrant-shaped concave curvature.

FIG. 12 shows an exemplary embodiment in which the structured surface 75 of the electrode 7 forms only a concave region 751, and accordingly the periphery 55 forms only a convex region 551. In this way, a rounded periphery 55 is provided.

The exemplary embodiment of FIG. 13 corresponds approximately to the exemplary embodiment of FIG. 12, wherein, however, an intermediate section 73 in which the electrode 7 conically widens is additionally provided between the front section 71 and the rear section 72 of the electrode 7. Accordingly, the flow passage 60 narrows in a flow direction in a section 63. This is associated with the advantage of an acceleration of the air in the flow passage 60. The provision of a conical region 73 of the electrode 7 may also have advantages in terms of production in the spark erosion process insofar as it is made easier for the electrode 7 to be pulled out of the flow passage 60 after the latter has been produced.

FIG. 14 shows an exemplary embodiment in which the periphery of the inlet opening has had no structure imparted to it. It is merely the case that a section 63 which narrows conically in a flow direction has been formed in the flow passage 60, which section is provided by a conical section 73 of the electrode 7. This exemplary embodiment illustrates that, by means of the production method of spark erosion, any desired shapes both of the flow passage 60 and of the periphery 55 can be provided.

FIG. 15 shows an exemplary embodiment of an electrode 7 which, on the one hand, has a rear section 72 which is considerably widened in relation to the front section 71 and which accordingly has a frontal structured surface 75 which comprises a large radial thickness, which electrode on the other hand comprises a conically running section 73. Here, the degree of conicity is determined by the angle α. In design variants, the conically running section 73 may also be used for widening or reworking the flow passage by means of cutting methods in a further machining step. Said conically running section however serves primarily for accelerating the flow, whereby a separation is even more effectively prevented.

The length of the conically running section 73 is illustrated merely by way of example. Said section 72 may alternatively be of longer or shorter form.

FIG. 16 shows an exemplary embodiment of the invention which differs from the exemplary embodiments described above in that a flow separation in the flow passage 60 is counteracted by virtue of the front side 51 of the wall 50 being connected to an inlet funnel 8 which protrudes from the front side 51 of the wall 50 and which surrounds the inlet opening 61 of the flow passage 60.

For this purpose, it is provided in the illustrated exemplary embodiment that the inlet funnel 8 constitutes a separately produced part which has been connected, for example fixedly welded, to the front side 51 of the wall 50. Here, a cylindrical wall region 81 of the inlet funnel 8 has been inserted into cutouts 58 formed by the pre-swirl nozzle carrier 5, adjacent to the flow passage 60, in the front wall 51. The inlet funnel 8 may basically also be connected to the wall 50 in some other way.

The inlet funnel 8 or the cylindrical wall region 81 thereof defines an inflow channel 80 of the inlet funnel, which runs coaxially with the flow passage 60 of the pre-swirl nozzle 6. The air is thus not subjected to any diversion at the transition from the inflow channel 80 to the flow passage 60.

For an inflow of air into the inlet funnel 8 with little separation, said inlet funnel has, at its end protruding from the front side 51, a funnel-shaped inlet 82 with rounded edges or ends 83. The inlet 82 into the inlet funnel 8 can, because the inlet funnel 8 is a separate component, be designed in an aerodynamically optimized manner.

FIG. 17 illustrates the method for producing a pre-swirl nozzle in a pre-swirl nozzle carrier corresponding to FIGS. 6-15. In step 171, it is firstly the case that a pre-swirl nozzle carrier is provided which has a wall with a front side and a rear side. Furthermore, in step 172, an electrode is provided which has a frontal structured surface, corresponding to the surface 75 of FIGS. 6, 8 and 11-15. In step 173, a flow passage is formed in the pre-swirl nozzle carrier, which flow passage extends from the front side of the wall to the rear side of the wall and has an inlet opening. In step 174, the electrode works gradually, by way of its frontal structured surface in the course of a spark-erosive machining process, into the front side of the wall, wherein a defined shape is imparted to the periphery of the inlet opening.

Here, one design variant provides that the flow passage is also produced in the course of the spark-erosive machining process, specifically in one method step with the imparting of a defined shape to the periphery of the inlet opening. Here, different sections of the electrode form, on the one hand, the flow passage and, on the other hand, the structured periphery of the inlet opening. It may alternatively be provided that the flow passage is produced in a separate production step, wherein this may also be performed by methods other than spark-erosive machining. Here, in one design variant, it may be provided that, in such a case, a front section of the electrode reworks the flow passage.

It will be understood that the invention is not limited to the embodiments described above, and various modifications and improvements can be made without departing from the concepts described herein. It is also pointed out that any of the features described may be used separately or in combination with any other features, unless they are mutually exclusive. The disclosure extends to and comprises all combinations and sub-combinations of one or a plurality of features which are described here. If ranges are defined, said ranges thus comprise all of the values within said ranges as well as all of the partial ranges that lie in a range.

The invention claimed is:

1. A pre-swirl nozzle carrier for a gas turbine engine, the pre-swirl nozzle carrier comprising:
    a wall of a static turbine component of the gas turbine engine, the wall having a front side and a rear side, the rear side facing a forward side of a rotating turbine disk of the gas turbine engine,
    a plurality of pre-swirl nozzles are formed in the wall and each of the plurality of pre-swirl nozzles has a respective flow passage which extends along a respective longitudinal axis of the respective flow passage from the front side of the wall to the rear side of the wall, wherein the respective flow passage has a respective inlet opening at the front side of the wall and a respective outlet opening at the rear side of the wall, wherein the respective flow passage is configured to discharge air, which has flowed in via the respective inlet opening, with swirl from the respective outlet opening the air flowing in a flow direction through the respective flow passage toward the forward side of the rotating turbine disk, wherein the respective inlet opening is surrounded by a respective periphery which, at least in certain longitudinal cross sections, has a region with a convex curvature adjacent to the respective flow passage and has a region with a concave curvature adjacent to the region with a convex curvature;

wherein, with respect to the flow direction through the respective flow passage, the region with a concave curvature is positioned downstream of the region with a convex curvature.

2. The pre-swirl nozzle carrier according to claim 1, wherein the respective periphery of the respective inlet opening is S-shaped in a longitudinal cross section.

3. The pre-swirl nozzle carrier according to claim 1, wherein the region with a convex curvature of the respective periphery extends over a greater radial thickness than the region with a concave curvature.

4. The pre-swirl nozzle carrier according to claim 1, wherein an outer boundary line of the respective periphery forms a semicircle in a longitudinal cross section in the region with a convex curvature and/or in the region with a concave curvature.

5. The pre-swirl nozzle carrier according to claim 1, wherein the respective periphery is symmetrical in a circumferential direction about the respective longitudinal axis.

6. The pre-swirl nozzle carrier according to claim 1, wherein the respective periphery is asymmetrical in a circumferential direction about the respective longitudinal axis.

7. The pre-swirl nozzle carrier according to claim 1, wherein the respective flow passage is formed obliquely in the wall adjacent to the front side, wherein the front side of the wall has a respective indentation in which the respective periphery of the respective inlet opening partially extends.

8. The pre-swirl nozzle carrier according to claim 1, wherein the respective flow passage is formed obliquely in the wall adjacent to the front side, wherein the respective periphery of the respective inlet opening lies in a respective plane which runs at an angle with respect to a plane of the front side.

9. The pre-swirl nozzle carrier according to claim 1, wherein:
the region with a concave curvature is positioned radially outwardly of the region with a convex curvature with respect to the respective longitudinal axis of the respective flow passage,
the region with a convex curvature forms a peninsula projecting upstream into the respective flow passage, the peninsula separated from a respective circumferentially outer wall of the respective flow passage by the region with a concave curvature.

10. A high-pressure turbine of a gas turbine engine, comprising:
the pre-swirl nozzle carrier according to claim 1, wherein the pre-swirl nozzle carrier is formed in a static component of the high-pressure turbine, and the pre-swirl nozzles of the pre-swirl nozzle carrier are configured to receive cooling air and divert the cooling air in a direction toward the forward side of the rotating turbine disk.

11. A method for producing a pre-swirl nozzle in a pre-swirl nozzle carrier, comprising:
providing the pre-swirl nozzle carrier including:
a wall of a static turbine component of a gas turbine engine, the wall having a front side and a rear side, the rear side facing a forward side of a rotating turbine disk of the gas turbine engine, wherein, a plurality of pre-swirl nozzles are formed in the wall, each of the plurality of pre-swirl nozzles having a respective flow passage which extends along a respective longitudinal axis of the respective flow passage from the front side of the wall to the rear side of the wall, wherein the respective flow passage has a respective inlet opening at the front side of the wall and a respective outlet opening at the rear side of the wall, and wherein the respective inlet opening of the respective flow passage is surrounded by a respective periphery, wherein the respective flow passage is configured to discharge air, which has flowed in via the respective inlet opening, with swirl from the respective outlet opening, the air flowing in a flow direction through the respective flow passage toward the forward side of the rotating turbine disk;
wherein the respective periphery is shaped, at least in certain longitudinal cross sections, with a region with a convex curvature adjacent to the respective flow passage and a region with a concave curvature adjacent to the region with a convex curvature;
wherein, with respect to the flow direction through the respective flow passage, the region with a concave curvature is positioned downstream of the region with a convex curvature;
producing the respective periphery of the respective inlet opening by a spark erosion process using an electrode which has a frontal structured surface, wherein, during the spark erosion process, the frontal structured surface of the electrode works gradually into the front side of the wall by material removal, and so imparts the respective shape to the respective periphery of the respective inlet opening.

12. The method according to claim 11, wherein the respective flow passage is also produced by the spark erosion process using the electrode, wherein a front portion of the electrode works gradually through the wall from the front side to the rear side by material removal corresponding to a respective course of the respective flow passage.

13. The method according to claim 11, and further comprising forming the respective flow passage in the wall in advance and then forming the respective shape of the respective periphery in a subsequent operation.

14. The method according to claim 11, wherein the frontal structured surface of the electrode has a concave surface which imparts the shaping of the region with a convex curvature, and adjacent to the concave surface is a convex surface which imparts the shaping of the region with a concave curvature, the concave surface is radially inward of the convex surface with respect to a longitudinal axis of the electrode.

15. The method according to claim 11, wherein the electrode has a front section, a rear section which is widened in relation to the front section, and a conically widening section between the front section and the rear section.

16. The method according to claim 11, wherein:
- the region with a concave curvature is positioned radially outwardly of the region with a convex curvature with respect to the respective longitudinal axis of the respective flow passage,
- the region with a convex curvature forms a peninsula projecting upstream into the respective flow passage, the peninsula separated from a respective circumferentially outer wall of the respective flow passage by the region with a concave curvature.

\* \* \* \* \*